Sept. 2, 1941.   L. KENNON   2,254,656
PRESSURE INDICATOR
Filed May 6, 1940
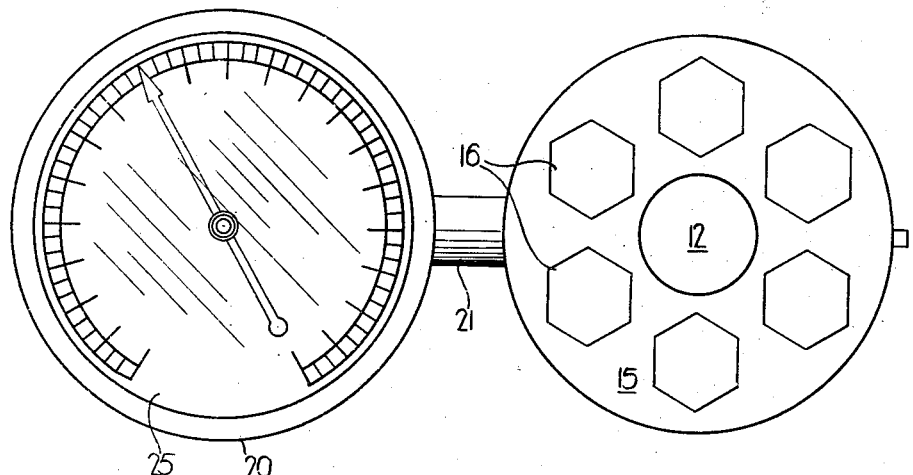
FIG-I
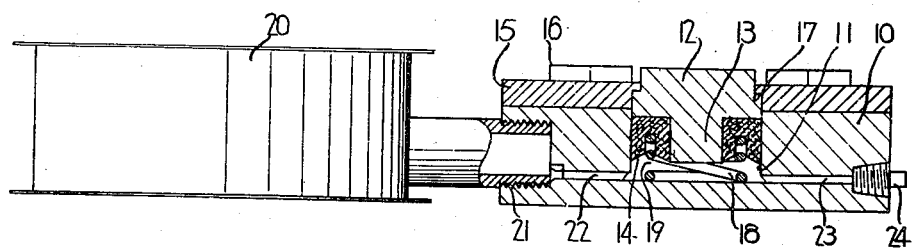
FIG-II
INVENTOR
Lorenzo Kennon Patented Sept. 2, 1941

2,254,656

UNITED STATES PATENT OFFICE 2,254,656

PRESSURE INDICATOR

Lorenzo Kennon, Burbank, Calif., assignor to Lockheed Aircraft Corporation, Burbank, Calif.

Application May 6, 1940, Serial No. 333,646

1 Claim. (Cl. 265—47)

This invention relates to improved means for calibrating electric resistance welding machines to check the pressures applied to the welding tips or rolls. Such pressures must be controlled within close limits since such a pressure variation changes the resistance value between the faying surfaces of the metal being welded.

An increase of as much as five pounds pressure will decrease the resistance resulting in a weak weld and a decrease of pressure will increase the resistance causing an overheated or cracked weld.

Heretofore, no consistently accurate method has been available for measuring the actual pressures between the el .crodes. One method in use is to use a gauge on the air pressure line operating the clamping mechanism, and to compute the resulting electrode pressure from the design characteristics of the clamping mechanism and leverage, preparing a chart of electrode pressure against air pressure. Such a method is subject to many uncontrolled variables which affect its initial and continued accuracy, such for example as friction in the air cylinder and mechanical leverage actuating the electrodes, so that even if the machine is accurately adjusted for perfect welds, there is no assurance that the conditions will remain static and so continue to produce perfect welds. Previous attempts at direct measurement of the electrode pressures have been lacking in the desired degree of accuracy and sensitiveness.

It is, accordingly, an object of this invention to provide an improved device for directly measuring electrode pressures within very close limits of accuracy, by a method that will consistently reproduce its original calibration.

It is a further object of this invention to provide an improved device of the class described that will be simple and direct in its application to spot and seam welding apparatus so that a frequent check can be made thereof without upsetting any special adjustments or necessitating removal of equipment or fixtures used to facilitate specialized production operations.

It is also an object of this invention to provide a simple and compact device of the class described that is self-contained, direct reading, and insertable between the electrodes of a welding machine.

Other and further important objects of this invention will be apparent from the disclosures in the specification and the accompanying drawing.

This invention in its preferred form is illustrated in the drawing and hereinafter more fully described.

In the drawing:

Figure I is a plan view of a device embodying the features of this invention.

Figure II is a side elevation of Figure I partly broken away to disclose the construction of the movable parts of the gauge.

As shown:

A cylinder block 10 has a central bore 11 to receive a ram 12 which has a central boss 13 to cooperate with a cuplike leather seal 14 which acts both against the boss 13 and the bore 11, being expanded thereagainst by fluid pressure. The ram 12 is retained in the bore 11 by a cover 15 held in place by thin headed cap screws 16. The cover 15 and ram 12 preferably have a stepped or shouldered engagement as indicated at 17 for both aligning the cover and guiding the ram. The ram 12 and its leather seal 14 are normally held against the cover 15 by a light spring 18, and the space 19 below the ram 12 and seal 14 allows the ram to be depressed in order to create pressure on a fluid filling said space.

A high pressure, precision hydraulic gauge 20 is suitably attached at 21 through the side of the cylinder block 10 and communicates through a passage 22 with the space 19 below the ram. This passage 22 is preferably restricted to provide a metering effect to prevent the transmission of shock impulses, due to rapid application of the loads, to the gauge 20. A similar passage 23 provides for filling the cylinder and gauge with a suitable fluid, being sealed by a plug 24.

It is of course evident that air must be eliminated from the gauge and cylinder, which can best be done by first filling the gauge, then mounting the cylinder block thereon and filling the latter through the passage 23 after applying vacuum thereto.

Due to the fact that the total pressure developed between the welding machine electrodes is desired, the gauge dial 25 is preferably calibrated to read directly in pounds or kilograms rather than in pressure on a unit area. Because of the high pressures developed, individual precision calibration of each gauge dial is desirable, but may not be essential for some purposes.

In using the gauge of this invention it is inserted between the spot or roll electrodes of an electric resistance welding machine and the clamping pressure applied, the gauge dial giving a direct reading of the total pressure produced, which can be compared with the indicated pressure of the welding machine air gauge for calibrating the latter if so desired. In practice, the welding machine will be adjusted to produce proper pressure at the electrodes and then this pressure will be measured by the device of this invention to establish a standard for the particular work, the welding machine being checked at frequent intervals by means of this device to assure against gradual changes during production runs.

It will thus be seen that I have invented an improved and simplified pressure measuring mechanism especially adaptable to measuring the clamping pressure developed between the electrodes of an electrical resistance welding machine of the spot, roll or bar type.

Having thus described my invention in its present preferred embodiment, I desire to emphasize the fact that many modifications may be restorted to in a manner limited only by a just interpretation of the following claim.

I claim:

A pressure measuring mechanism adapted for insertion between the electrodes of a spot or roll electric resistance welding machine, comprising a base member having a vertical cylindrical recess in one face thereof, a pressure gauge attached to one side of said base member in direct but restricted communication with the inner end of said cylindrical recess, a concentrically shouldered piston slidingly engaging in said cylindrical recess, a central boss projecting inwardly from said piston, annular expansible packing means disposed between the boss and the cylindrical recess and adapted to sealingly contact both the piston boss and the walls of said recess, a coiled spring seating in said packing means and against the bottom of the recess, a centrally apertured cover normally seating against the shoulder of said piston and secured to said base member whereby to limit the outward movement of said piston, and means for completely filling the gauge and cylindrical recess with fluid to eliminate entrapped air.

LORENZO KENNON.